Patented May 13, 1952

2,596,140

UNITED STATES PATENT OFFICE 2,596,140

MONOALKYL DICRESYL PHOSPHATE ESTERS

Harry R. Gamrath, St. Louis, and John Kenneth Craver, Webster Groves, Mo., assignors to Monsanto Chemical Company, St. Louis, Mo., a corporation of Delaware No Drawing. Application February 17, 1950, Serial No. 144,861

11 Claims. (Cl. 260—461)

This invention relates to new esters of phosphoric acid, and more specifically, to certain monoalkyl dicresyl phosphate esters of the general formula

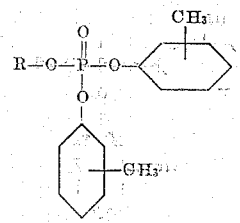

wherein R represents a branched chain alkyl radical terminating with a $CH_2$ group and containing at least 6 and not more than 18 carbon atoms.

The monoalkyl dicresyl phosphate esters of this invention are generally nearly colorless liquids having mild pleasant odors. These new esters have exceptional utility as flexibilizing plasticizers for polyvinyl chloride compositions, imparting to such plasticized compositions the properties of flexibility at freezing temperatures, low volatility losses of plasticizers at higher temperatures, and non-flammability.

Because of their very low pour point, high autogenous ignition temperatures and stability against decomposition, these monoalkyl dicresyl phosphates have been found to possess outstanding utility in the field of functional fluids where they are particularly useful as synthetic lubricants and force transmission fluids, having exceptionally high inherent lubricity. Furthermore, because of their compatibility with paraffinic hydrocarbon oils, these monoalkyl dicresyl phosphates may be combined with paraffinic hydrocarbon oils to prepare hydraulic and torque converter fluids of highly desirable characteristics. Moreover, these esters have a wide variety of other uses such as film-forming addition agents for extreme pressure lubricants and as the liquid medium for filters for air conditioning systems.

The monoalkyl dicresyl phosphates may be prepared in the manner illustrated in the following examples:

EXAMPLE I

2-ethylhexyl dicresyl phosphate 44.3 g. of $POCl_3$ are cooled with stirring to about 10° C. in a glass lined closed reaction vessel. 37.6 g. of 2-ethylhexanol are cooled to approximately 15° C. and added to the $POCl_3$ with continuous stirring and at a rate so as to maintain a reaction temperature of about 15° C. The reaction mixture is agitated and the reaction temperature of 15° C. is maintained for one hour following the addition of all the 2-ethylhexanol, thereafter the temperature is allowed to rise to approximately 25° C. and the stirring continued for another hour. The hydrogen chloride gas which is evolved from the reaction is continuously removed by means of applying a vacuum to the reaction vessel.

After the reaction between the 2-ethylhexanol and the $POCl_3$ and the removal of the hydrogen chloride have been completed, the reaction mixture containing 2-ethylhexyl phosphoryl dichloride is transferred to a reactor containing 246 g. of an aqueous solution, cooled to about 0° C. having a composition of 32.1% sodium cresylate. The 2-ethylhexyl phosphoryl dichloride is added to the aqueous sodium cresylate solution at such a rate as to maintain a temperature below 5° C. After all the 2-ethylhexyl phosphoryl dichloride has been added to the aqueous sodium cresylate solution, the reaction mixture is agitated for an hour and then with continuous stirring the temperature is gradually raised to 30° C. The reaction mixture is then allowed to stand until an ester layer and an aqueous layer form and the crude ester layer is separated from the aqueous layer. The crude ester is given successive washes with 2% NaOH solution and water thereby removing the unreacted cresol and partial esters, and reducing the alkalinity of the mass until it is acid to phenolphthalein, and then further refined in accordance with the usual methods well known to those skilled in the art of refining phosphate esters. The yield, based on $POCl_3$, was 90%.

The 2-ethylhexyl dicresyl phosphate which was prepared by the above method had the following properties:

| | |
|---|---|
| Sp. gr. 25/25° C | 1.064 |
| $N_D^{25}$ | 1.507 |
| Boiling point at 5 mm | Approx. 243° C. |
| Melting point | Below −30° C. |
| Color | Nearly water white |

The above described 2-ethylhexyl dicresyl phosphate was prepared from a cresol containing meta-cresol and some para-cresol, however, this cresol was substantially free from the ortho-isomer.

EXAMPLE II

Iso-octyl dicresyl phosphate 153.4 g. of $POCl_3$ are cooled with stirring to about 10° C. in a glass lined closed reaction vessel. 130.2 g. of iso-octyl alcohol are cooled to about 10° C. and added to the POCl₃ with continuous stirring and cooling and at a rate so as to maintain a reaction temperature of 10 to 15° C. After all of the iso-octyl (6-methyl-1-heptanol) alcohol has been added to the reaction, the cooling means is removed and while the agitation is continued the reaction temperature is allowed to rise to room temperature. Thereafter, the stirring is continued while the reaction mixture is placed under a vacuum (below 50 mm. Hg absolute) for 1½ hours to complete the reaction and removing the hydrogen chloride gas which is evolved from the reaction. The product of the above reaction between iso-octyl alcohol and phosphorus oxychloride is iso-octyl phosphoryl dichloride.

An aqueous sodium cresylate solution is prepared by adding 227 g. of cresol to 280 cc. of water having dissolved therein 180.7 g. of 46.5% sodium hydroxide. This sodium cresylate solution is cooled to 0 to 3° C. and the above prepared iso-octyl phosphoryl dichloride is gradually added to the sodium cresylate solution at such a rate as to maintain a reaction temperature below 5° C. After all of the iso-octyl phosphoryl dichloride has been added to the sodium cresylate solution, the temperature is allowed to rise to about 25° C. and the reaction mixture stirred for an additional 3 hours, thereafter the iso-octyl dicresyl phosphate is recovered and purified in the manner as described in the previous example. The yield of iso-octyl dicresyl phosphate, based on POCl₃, was 89%.

EXAMPLE III

Nonyl dicresyl phosphate 460.2 g. of POCl₃ are cooled with stirring to a temperature of 5 to 10° C. in a glass lined closed reaction vessel. 432.8 g. of a nonyl alcohol (a trimethyl substituted primary hexanol) are cooled to 5 to 10° C. and are added to the POCl₃ with continuous stirring and at a rate so as to maintain a reaction-mass temperature of about 15° C. The reaction mixture is agitated and the temperature of the reaction mixture is allowed to come up to room temperature, thereafter the stirring is continued and the reaction mixture is placed under a vacuum (below 50 mm. Hg absolute) over a period of 2 hours thereby removing the hydrogen chloride gas which is evolved from the reaction.

An aqueous solution of sodium cresylate is prepared by adding 686.7 g. of cresol to 840 cc. of water having dissolved therein 542.0 g. of 46.5% sodium hydroxide. The aqueous sodium cresylate solution is cooled to 0° C. and the nonyl phosphoryl dichloride, prepared by the reaction of the nonyl alcohol and the POCl₃, is added to the aqueous sodium cresylate solution at such a rate as to maintain a temperature below 5° C. After all of the nonyl pohosphoryl dichloride has been added to the aqueous sodium cresylate solution, the reaction mixture is agitated for a period of 3 hours and allowed to warm up to room temperature. When the agitation is stopped, the reaction mixture separates into an ester layer and an aqueous layer and the ester layer may be then separated from the aqueous layer by decantation. The ester layer is given successive washes with 2% NaOH solution and water thereby removing the unreacted phenol and partial esters and reducing the alkalinity of the mass until it is acid to phenolphthalein and then further refined in accordance with the usual methods well known to those skilled in the art of refining phosphate esters. The yield, based on POCl₃, was 89.7%.

EXAMPLE IV

2-methylpentyl dicresyl phosphate 2-methylpentyl phosphoryl dichloride was prepared by adding 102.1 g. of 2-methylpentanol, cooled to 10° C., to 153.4 g. of phosphorus oxychloride cooled to 10° C. with stirring and cooling and at a rate so as to maintain a reaction temperature of 10 to 15° C. After all of the 2-methylpentanol had been added to the phosphorus oxychloride the reaction was carried to completion to form 2-methylpentyl phosphoryl dichloride in the same manner as was described for the preparation of iso-octyl phosphoryl dichloride.

The 2-methylpentyl phosphoryl dichloride was reacted with an aqueous sodium cresylate solution cooled to 3° C. and prepared by adding 227 g. of cresol to 280 cc. of water having dissolved therein 180.7 g. of 46.5% sodium hydroxide, at such a rate so as to maintain a reaction temperature of 3 to 5° C. After all of the 2-methylpentyl phosphoryl dichloride had been added to the sodium cresylate solution, the cooling means was removed and the reaction temperature allowed to rise to 22° C. Thereafter, the reaction was carried to completion by continuous agitation for about 1½ hours. The 2-methylpentyl dicresyl phosphate was then recovered and purified in the manner described for the preparation of nonyl dicresyl phosphate. The yield of 2-methylpentyl dicresyl phosphate, based on POCl₃, was 90%.

The 2-methylpentyl dicresyl phosphate prepared as above described had the following properties:

| | |
|---|---|
| Sp. gr. 25/25° C. | 1.081 |
| $N_D^{25}$ | 1.511 |
| Melting point | Below −30° C. |
| Color | Nearly water white |

EXAMPLE V

2-ethylbutyl dicresyl phosphate 51.1 g. of 2-ethylbutanol were cooled to about 10° C. and slowly added to 76.7 g. of phosphorus oxychloride cooled to 10° C. in a closed glass lined reaction vessel at such a rate as to maintain a reaction temperature of 12 to 14° C. After all of the 2-ethylbutanol had been added to the POCl₃, the reaction was carried to completion with the formation of 2-ethylbutyl phosphoryl dichloride in the same manner as was described for the preparation of 2-methylpentyl phosphoryl dichloride.

The 2-ethylbutyl phosphoryl dichloride was then added to an aqueous sodium cresylate solution, cooled to 0° C. and prepared by adding 113.4 g. of cresol to 230 g. of 18.2% sodium hydroxide solution. The 2-ethylbutyl phosphoryl dichloride is added to the sodium phenate solution at such a rate as to maintain a reaction temperature of about 5° C. After all of the 2-ethylbutyl phosphoryl dichloride had been added to the sodium cresylate solution, the reaction was carried to completion, the ester recovered and purified in the same manner as was described for the preparation of 2-ethylhexyl dicresyl phosphate. The yield of 2-ethylbutyl dicresyl phosphate, based on POCl₃, was substantially 90%.

EXAMPLE VI

Dodecyl dicresyl phosphate 118.5 g. of 2-butyloctanol were cooled with stirring to about 20° C. in a glass lined closed reaction vessel. 97.8 g. of POCl₃ were added, with continuous stirring and cooling, at a rate so as to maintain a reaction temperature of about 20° C. The reaction mixture is agitated and the temperature is slowly raised to 30° to 40° C. and maintained at that temperature for one hour following the addition of all the 2-butyloctanol; thereafter, the temperature is raised to approximately 50° C. and the stirring continued for another hour. The hydrogen chloride gas which is evolved from the reaction is continuously removed by means of applying a vacuum to the reaction vessel.

After the reaction between the 2-butyloctanol and the POCl₃ and the removal of the hydrogen chloride have been completed the reaction mixture containing 2-butyloctyl phosphoryl dichloride is transferred to a reactor containing an aqueous sodium cresylate solution, at a temperature below 5° C., prepared from 180 cc. of water, 144.5 g. of cresol and 115.4 g. of 46.5% soda lye. The 2-butyloctyl phosphoryl dichloride is added to the sodium cresylate solution at such a rate as to maintain a temperature below 5° C. After all the 2-butyloctyl phosphoryl dichloride has been added to the sodium cresylate solution, the reaction mixture is agitated for an hour and then with continuous stirring the temperature is gradually raised to 30° C. The reaction mixture is then allowed to stand until an ester layer and an aqueous layer form and the crude ester layer is separated from the aqueous layer. The separation of the 2-butyloctyl dicresyl phosphate from the aqueous solution is not always sharp and, therefore, it is usually desirable to add sodium chloride to the reaction mixture to aid in the salting out of the ester. The crude ester is given successive washes with NaOH solution and water thereby removing the unreacted phenol and partial esters, and reducing the alkalinity of the mass until it is acid to phenolphthalein, and then further refined in accordance with the usual methods well known to those skilled in the art of refining phosphate esters. The yield, based on POCl₃, was 87.5%.

EXAMPLE VII

2-n-propylheptyl dicresyl phosphate 2-n-propylheptyl phosphoryl dichloride may be prepared by reacting at 15 to 20° C. 158.3 g. of 2-n-propylheptanol with 153.4 g. of POCl₃ in the manner as described for the preparation of the dodecyl phosphoryl dichloride. The 2-n-propylheptyl phosphoryl dichloride is then added to an aqueous solution of sodium cresylate, cooled to 0° C. and prepared by adding 227 g. of cresol to 280 cc. of water having dissolved therein 180.7 g. or 46.5% of soda lye, at a rate so as to maintain a reaction temperature of 0 to 5° C. and carrying the reaction to completion recovering and purifying the ester as described for the preparation of dodecyl dicresyl phosphate. A yield of 2-n-propylheptyl dicresyl phosphate, based on POCl₃, of substantially 90% may be had.

EXAMPLE VIII

Tridecyl dicresyl phosphate 120.1 g. of a 13 carbon branched chain primary alcohol prepared from the polymerization products of olefins were cooled to about 20° C. and added to 92.0 g. of POCl₃ cooled to about 20° C. in a glass lined closed reaction vessel with continuous stirring and cooling so as to maintain a reaction temperature of about 20° C. The reaction mixture was agitated and the temperature slowly raised to 30° to 40° C. and maintained at that temperature for one hour following the addition of all the tridecyl alcohol. The temperature was then raised to about 50° C. and the stirring continued for another hour. The hydrogen chloride gas which was evolved from the reaction was continuously removed by means of applying a vacuum to the reaction vessel.

158.9 g. of the above prepared tridecyl phosphoryl dichloride were transferred to a reactor containing about 340 g. of an aqueous sodium cresylate solution, at a temperature below 15° C., prepared from 140 cc. of water, 113 g. of cresol and 87.0 g. of 48.3% sodium hydroxide. The tridecyl phosphoryl dichloride was added to the sodium cresylate solution at such a rate as to maintain a temperature between 11° and 14° C. After all the tridecyl phosphoryl dichloride had been added to the sodium cresylate solution, the reaction was carried to completion. The reaction mixture was then allowed to stand until an ester layer and an aqueous layer formed and the ester layer was separated from the aqueous layer. The ester was given successive washes with NaOH solution and water and then dehydrated under vacuum at 100° C. The yield, based on POCl₃, was 89.8%.

EXAMPLE IX

Tetradecyl dicresyl phosphate 76.7 g. of POCl₃ were cooled with stirring to a temperature of 5° to 10° C. in a glass lined closed reaction vessel. 107.1 g. of a 14 carbon branched chain primary alcohol prepared from the polymerization products of olefins were cooled to 5° to 10° C. and added to the POCl₃ with continuous stirring at a rate so as to maintain a reaction mass temperature of about 15° C. The reaction mixture was agitated and the temperature of the reaction mixture allowed to come up to room temperature, thereafter the stirring was continued and the reaction mixture placed under a vacuum (below 50 mm. Hg absolute) over a period of 2 hours thereby removing the hydrogen chloride gas which was evolved during the reaction.

An aqueous solution of sodium cresylate was prepared by adding 89.5 g. of cresol to 130 cc. of water having dissolved therein 69.7 g. of 48.3% sodium hydroxide. The aqueous sodium cresylate solution was cooled to about 5° C. and 132.5 g. of the above prepared tetradecyl phosphoryl dichloride was added to the aqueous sodium cresylate solution over a period of about two hours and at such a rate as to maintain a temperature between 5° and 15° C. After all of the tetradecyl phosphoryl dichloride was added the reaction was taken to completion and then allowed to stand and separate into an ester layer and an aqueous layer. The ester layer was removed and given successive washes with a 2% NaOH solution and water and then dehydrated under vacuum at about 100° C. The yield, based on POCl₃, was 87%.

EXAMPLE X

Octadecyl dicresyl phosphate

The octadecyl alcohol used in this example was 2 - (1,3,3 - trimethylbutyl) - 5,7,7 - trimethyl-1- octanol prepared from the polymerization products of olefins.

76.7 g. of POCl₃ were cooled with stirring to about 25° C. in a glass lined closed reaction vessel. 135.5 g. of the above described octadecyl alcohol were cooled and added to the POCl₃ at a rate so as to maintain a reaction temperature of about 25° C. The reaction mixture was continuously agitated and the temperature allowed to rise to room temperature and maintained at this temperature for an additional one hour stirring period during which time the hydrogen chloride gas evolved during the reaction was removed by means of applying a vacuum (below 30 mm. Hg absolute) to the reaction vessel.

The octadecyl phosphoryl dichloride was then transferred, to a reactor containing an aqueous sodium cresylate solution cooled to 25° C. and prepared by adding 113 g. of cresol to 139 cc. of water having dissolved therein 90.5 g. of 46.5% sodium hydroxide. The octadecyl phosphoryl dichloride was added to the aqueous sodium cresylate solution at such a rate as to maintain a temperature below 30° C. After all the octadecyl phosphoryl dichloride was added the reaction mixture was stirred for an additional three hours allowing the mixture to come to room temperature. On standing the reaction mixture separated into an aqueous layer and an ester layer. The ester layer was removed and given successive washes with 2% NaOH solution and water and finally dehydrated under vacuum at about 110° C. The yield of octadecyl dicresyl phosphate, based on POCl₃, was about 87%.

The novel nonoalkyl dicresyl phosphates of this invention possess many outstanding and unexpected properties, permitting their utility in many new and varied applications. A most significant, outstanding and unexpected property of the novel phosphate esters of this invention is their substantial non-toxicity. This non-toxicity permits a safe and more widely diversified use of these prosphate esters, particularly as plasticizers for synthetic resins where the use of formerly known phosphate esters, such as tricresyl phosphate and triphenyl phosphate required consideration of the toxicity factor. Indicative of the behavior of the novel phosphate esters of this invention is the toxicity of 2-ethylhexyl dicresyl phosphate prepared in Example I, which has been tested for acute and subacute oral toxicity in two species of animals. Amounts up to 24 ml. (26.2 g) per kilogram of body weight were administered orally to rats and rabbits without any symptoms or evidence of systemic toxicity. 8.48 g. per kilogram of body weight were administered daily for 25 days without any ill effects. Moreover, 2-ethylhexyl dicresyl phosphate does not appear to exert any cumulative effect.

With respect to toxicity, 2-ethylhexyl dicresyl phosphate is considerably different from other phosphate esters, particularly the triaryl phosphates such as tricresyl phosphate and triphenyl phosphate. The lethal dose of tricresyl (tri-m-crecyl) phosphate varies, however, it is definitely of the order of one gram per kilogram of body weight. In addition, tricrecyl phosphate exerts a very striking cumulative effect. The lethal dose of triphenyl phosphate likewise varies with the species of animals subjected to the toxicity tests, however, the toxicity of triphenyl phosphate is of the order of 0.2 to 0.3 gram per kilogram of body weight for cats and mice.

It is apparent from the foregoing that 2-ethylhexyl dicresyl phosphate is substantially non-toxic, and that this outstanding property was quite unexpected and unpredictable in view of the known toxicity of the triaryl phosphates.

Another very significant, outstanding and unexpected physical property of the monalkyl dicresyl phosphates of this invention is their outstanding hydrolytic stability. It has been found that the novel branched chain alkyl dicresyl phosphate esters of this invention possess an outstanding hydrolytic stability which permits the preparation of exceptionally stable plasticized polyvinyl chloride compositions and exceptionally stable functional fluids such as hydraulic and torque converter fluids. The unexpected nature of this outstanding physical property is made evident by a comparison of the hydrolytic stability of the novel branched chain dicresyl phosphate esters of this invention with the isomeric straight chain alkyl dicresyl phosphate esters.

In determining the hydrolytic stability of the phosphate esters, 10 g. of the ester to be tested and 100 ml. of freshly boiled, distilled water were placed in a round bottomed flask and refluxed for 24 hours. The mixture was then allowed to cool and was titrated with N/10 sodium hydroxide using thymol blue indicator. The titration was corrected for the acidity present in the starting materials as determined by a blank. The amount of N/10 sodium hydroxide is a measure of the hydrolysis that occurred during the refluxing. The following table sets forth the hydrolytic stability of phosphate esters so evaluated:

| Phosphate Estes | Ml. N/10 NaOH per mole |
| --- | --- |
| n-Octyl dicresyl phosphate | 43.7 |
| n-Dodecyl dicresyl phosphate | 38.8 |
| 2-Ethylhexyl dicresyl phosphate | 17.2 |
| 2-Ethylbutyl dicresyl phosphate | 22.8 |

The preceding table is indicative of the superiority of the novel monoalkyl dicresyl phosphates of this invention. The outstanding superiority of the hydrolytic stability of these novel esters, even as compared to their straight chain isomers, is clearly unexpected and unpredictable. Heretofore phosphate esters had limited utility because of what was believed to be their inherently poor hydrolytic stability. Hence, the phosphate esters heretofore known could not be utilized to any practical degree of satisfaction in plasticized polyvinyl chloride compositions which were destined to be subjected to prolonged and continued exposure to elevated temperatures in the presence of moisture. Similarly, the phosphate esters heretofore known could not be utilized to any practical degree as functional fluids as the hydrolytic instability of these materials at elevated temperatures caused the formation of acidic materials which corroded the standard equipment utilized in such applications. As a result of this invention, however, a new class of outstandingly stable phosphate esters is now disclosed, having utility in many fields wherein the phosphate esters heretofore known had no practical utility.

The novel esters of this invention are further unique, as compared to the isomeric straight chain alkyl dicresyl phosphates, in that as the number of carbon atoms in the alkyl chain in the novel esters of this invention is increased, the viscosity of the branched chain alkyl dicresyl phosphate esters increases without a significant sacrifice of desirable pour point characteristics permitting the preparation of a wide range of heavier-bodied lubricants. This is not possible with the isomeric straight chain alkyl dicresyl phosphates wherein as the number of carbon atoms in the alkyl chain is increased, the viscosity of the material does not significantly increase. This unusual phenomenon is illustrated in the following table:

Viscosity (centistokes) and pour point of alkyl dicresyl phosphates

|  | Pour Pt. | Viscosity | |
|---|---|---|---|
|  |  | 100° F. | 210° F. |
| 2-ethylbutyl dicresyl phosphate | °F. −55 | 14.1 | 2.87 |
| 2-ethylhexyl dicresyl phosphate | −55 | 16.9 | 3.17 |
| n-octyl dicresyl phosphate | −60 | 15.3 | 3.15 |
| branched tridecyl dicresyl phosphate | −40 | 37.5 | 4.87 |
| n-dodecyl dicresyl phosphate | −45 | 19.9 | 3.93 |

This application is a continuation-in-part of copending application Serial No. 374, filed January 2, 1948, now abandoned, which was a continuation-in-part of application Serial No. 720,310, filed January 4, 1947, now abandoned.

What is claimed is:

1. As new chemical compounds, the monoalkyl dicresyl phosphate esters, having the formula

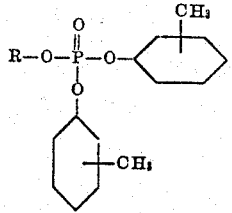

wherein R represents a branched chain alkyl radical terminating with a CH$_2$ group and containing at least 6 and not more than 18 carbon atoms.

2. As new chemical compounds, the monoalkyl dicresyl phosphate esters, having the formula wherein R represents a branched chain alkyl radical, derived from a branched chain primary alcohol, containing at least 6 and not more than 18 carbon atoms.

3. As new chemical compounds, the monoalkyl dicresyl phosphate esters wherein the alkyl radical is a branched chain alkyl radical terminating with a CH$_2$ group and containing 8 carbon atoms.

4. 2-ethylhexyl dicresyl phosphate.

5. 6-methylheptyl dicresyl phosphate.

6. As a new chemical compound, the monoalkyl dicresyl phosphates wherein the alkyl group is a branched chain alkyl radical terminating with a CH$_2$ group and containing 6 carbon atoms.

7. 2-methylpentyl dicresyl phosphate.

8. As new chemical compounds, the monoalkyl dicresyl phosphates wherein the alkyl group is a branched chain alkyl radical terminating with a CH$_2$ group and containing 9 carbon atoms.

9. Trimethylhexyl dicresyl phosphate.

10. As new chemical compounds, the monoalkyl dicresyl phosphate esters wherein the alkyl radical is a branched chain alkyl radical containing 12 carbon atoms.

11. 2-butyloctyl dicresyl phosphate.

HARRY R. GAMRATH.
JOHN KENNETH CRAVER.

REFERENCES CITED

The following references are of record in the file of this patent:

UNITED STATES PATENTS

| Number | Name | Date |
|---|---|---|
| 2,005,619 | Graves | June 18, 1935 |
| 2,406,802 | Carruthers | Sept. 3, 1946 |